United States Patent
Sato et al.

(10) Patent No.: US 8,154,243 B2
(45) Date of Patent: Apr. 10, 2012

(54) FUEL CELL POTENTIAL MEASURING APPARATUS AND MANUFACTURING METHOD THEREFOR

(75) Inventors: Masahiko Sato, Utsunomiya (JP); Hiromichi Yoshida, Shioya-gun (JP); Toshifumi Suzuki, Fuchu (JP)

(73) Assignee: Honda Motor Co., Ltd., Tokyo (JP)

( * ) Notice: Subject to any disclaimer, the term of this patent is extended or adjusted under 35 U.S.C. 154(b) by 457 days.

(21) Appl. No.: 12/507,319

(22) Filed: Jul. 22, 2009

(65) Prior Publication Data

US 2010/0021781 A1  Jan. 28, 2010

(30) Foreign Application Priority Data

Jul. 24, 2008  (JP) ................................ 2008-190698

(51) Int. Cl.
*H02J 7/00* (2006.01)
*H01M 8/04* (2006.01)

(52) U.S. Cl. ........ 320/101; 320/162; 429/428; 429/432; 429/474

(58) Field of Classification Search ................... 320/101
See application file for complete search history.

(56) References Cited

U.S. PATENT DOCUMENTS

| | | | | |
|---|---|---|---|---|
| 7,466,137 B2* | 12/2008 | Ariyoshi | | 324/426 |
| 2005/0213409 A1* | 9/2005 | Wakahoi et al. | | 365/222 |
| 2010/0178590 A1* | 7/2010 | Shirakawa | | 429/507 |
| 2010/0316920 A1* | 12/2010 | Makita et al. | | 429/432 |

FOREIGN PATENT DOCUMENTS

JP  2004-095301  3/2004

* cited by examiner

*Primary Examiner* — Edward Tso
*Assistant Examiner* — Johali Torres Ruiz
(74) *Attorney, Agent, or Firm* — Nelson Mullins Riley & Scarborough LLP; Anthony A. Laurentano

(57) ABSTRACT

A fuel cell potential measuring apparatus includes a first sheet member which is arranged on an anode side, and a second sheet member which is arranged on a cathode side. On the first sheet member, an anode potential-applying electrode and an anode potential-measuring electrode are disposed on an end portion thereof, whereas on the second sheet member, a cathode potential-applying electrode and a cathode potential-measuring electrode are disposed on an end portion thereof. Another end portion of the first sheet member and another end portion of the second sheet member are joined together mutually.

8 Claims, 7 Drawing Sheets

FUEL CELL POTENTIAL MEASURING APPARATUS AND MANUFACTURING METHOD THEREFOR

BACKGROUND OF THE INVENTION

1. Field of the Invention

The present invention relates to a fuel cell potential measuring apparatus and a manufacturing method therefor, for measuring the electric potential of a fuel cell, in which an electrolyte electrode assembly, made up of an anode and a cathode provided on respective opposite sides of an electrolyte, is interposed between separators.

2. Description of the Related Art

For example, a solid polymer electrolyte fuel cell employs an electrolyte membrane (electrolyte) made up from a polymer ion exchange membrane. A membrane electrode assembly (MEA), which includes an anode and a cathode with an electrolyte membrane sandwiched between the anode and cathode, is interposed between separators. The membrane electrode assembly and the separators make up a unit of a fuel cell (unit cell) for generating electricity.

In this case, in the fuel cell, after the supply of a fuel gas and an oxygen-containing gas is halted accompanying stoppage of operation, it is still easy for reactions to occur between the residual fuel gas and oxygen-containing gas, which remain within the fuel cell. Owing thereto, in particular, there is a concern that the pressure inside the fuel gas flow passage will be lowered accompanying a reduction in volume of the fuel gas on the side of the fuel gas flow passage, and that the oxygen-containing gas will permeate through the electrolyte membrane from the side of the oxygen-containing gas flow passage and invade into the fuel gas flow passage. As a consequence thereof, inside the fuel gas flow passage, it is easy for a localized battery to be formed in regions where the fuel gas is improperly localized, and for a current to flow in a direction reverse to a current direction of normal power generation in regions where the oxygen-containing gas is improperly localized.

Consequently, an electrode potential measuring device for a fuel cell is known, as disclosed in Japanese Laid-Open Patent Publication No. 2004-095301. According to such a conventional technique, as shown in FIG. 7, an electrode potential measuring device 3 is incorporated in a fuel cell stack in which a pair of separators 2 sandwich a unit cell 1 therebetween. In the unit cell 1, a solid polymer electrolyte 1a is interposed between an oxygen electrode 1b and a fuel electrode 1c.

The electrode potential measuring device 3 is equipped with a detector 4, a voltmeter 5, and conductive wires 6a, 6b. The detector 4 comprises a detection piece 4a disposed within the oxygen electrode 1b, a detection terminal 4b connected to a surface of the detection piece 4a, and a protective member 4c for protecting the detection terminal 4b. A portion of the oxygen electrode 1b is cut out, and the detection piece 4a is disposed therein in state of being insulated from the oxygen electrode 1b through an insulating member 4d.

The detection piece 4a contacts the solid polymer electrolyte 1a and is ionically-conductive with the solid polymer electrolyte 1a. As a result thereof, abnormal potentials, occurring at locations where air (oxygen) is improperly localized on the side of the fuel electrode 1c, can be detected.

However, with the aforementioned conventional technique, a cutout portion is formed in the oxygen electrode 1b and the detection piece 4a is provided therein. Also, a gap between the detection piece 4a and the surrounding oxygen electrode 1b is filled with an insulating material serving as the insulating member 4d, so that the gap must be provided therebetween. Owing thereto, the structure becomes considerably complex. In addition, the influence of water, which is formed upon power generation, makes it difficult to accurately detect the potential.

SUMMARY OF THE INVENTION

The present invention has been made to solve the above-mentioned difficulties, and an object of the present invention is to provide a fuel cell potential measuring apparatus and a manufacturing method therefor, which are capable of reliably and suitably carrying out measurement of the potential of a fuel cell by means of a simple structure and process, while also reducing the overall thickness of the apparatus.

The present invention relates to a fuel cell potential measuring apparatus and manufacturing method therefor, for measuring the electric potential of a fuel cell, in which an electrolyte electrode assembly, made up of an anode and a cathode provided on respective opposite sides of an electrolyte, is interposed between separators.

The fuel cell potential measuring apparatus comprises a first sheet member on which an anode potential-applying electrode and an anode potential-measuring electrode are disposed on an end portion thereof which is arranged on the anode, and a second sheet member on which a cathode potential-applying electrode and a cathode potential-measuring electrode are disposed on an end portion thereof which is arranged on the cathode, wherein another end portion of the first sheet member and another end portion of the second sheet member are joined together mutually.

Further, the manufacturing method comprises the steps of integrally forming, on a sheet-like base member, patterns made up of a potential-applying electrode and a potential-measuring electrode, affixing a cover film on the sheet-like base member, thereby forming a sheet member, while leaving only the potential-applying electrode and the potential-measuring electrode externally exposed thereon, and in a state in which the potential-applying electrodes and the potential-measuring electrodes disposed respectively on ends of two of such sheet members face each other, joining together respectively other end portions of the two sheet members.

According to the present invention, the first sheet member on which the anode potential-applying electrode and the anode potential-measuring electrode are disposed, and the second sheet member on which the cathode potential-applying electrode and the cathode potential-measuring electrode are disposed, are joined together mutually. Owing thereto, compared to a case in which the potential-applying electrode and the potential-measuring electrode are separately constituted, structure of the device is simplified, the work required for assembly thereof is significantly reduced, and the apparatus is economical in cost.

In addition, the electric potential measuring apparatus comprises a first sheet member and a second sheet member. Consequently, measurement of the electric potential of a fuel cell can be performed reliably and favorably utilizing a simple structure and process, while also enabling a reduction in the overall thickness of the apparatus.

The above and other objects, features and advantages of the present invention will become more apparent from the following description when taken in conjunction with the accompanying drawings in which a preferred embodiment of the present invention is shown by way of illustrative example.

DESCRIPTION OF THE PREFERRED EMBODIMENTS

Figure 1:
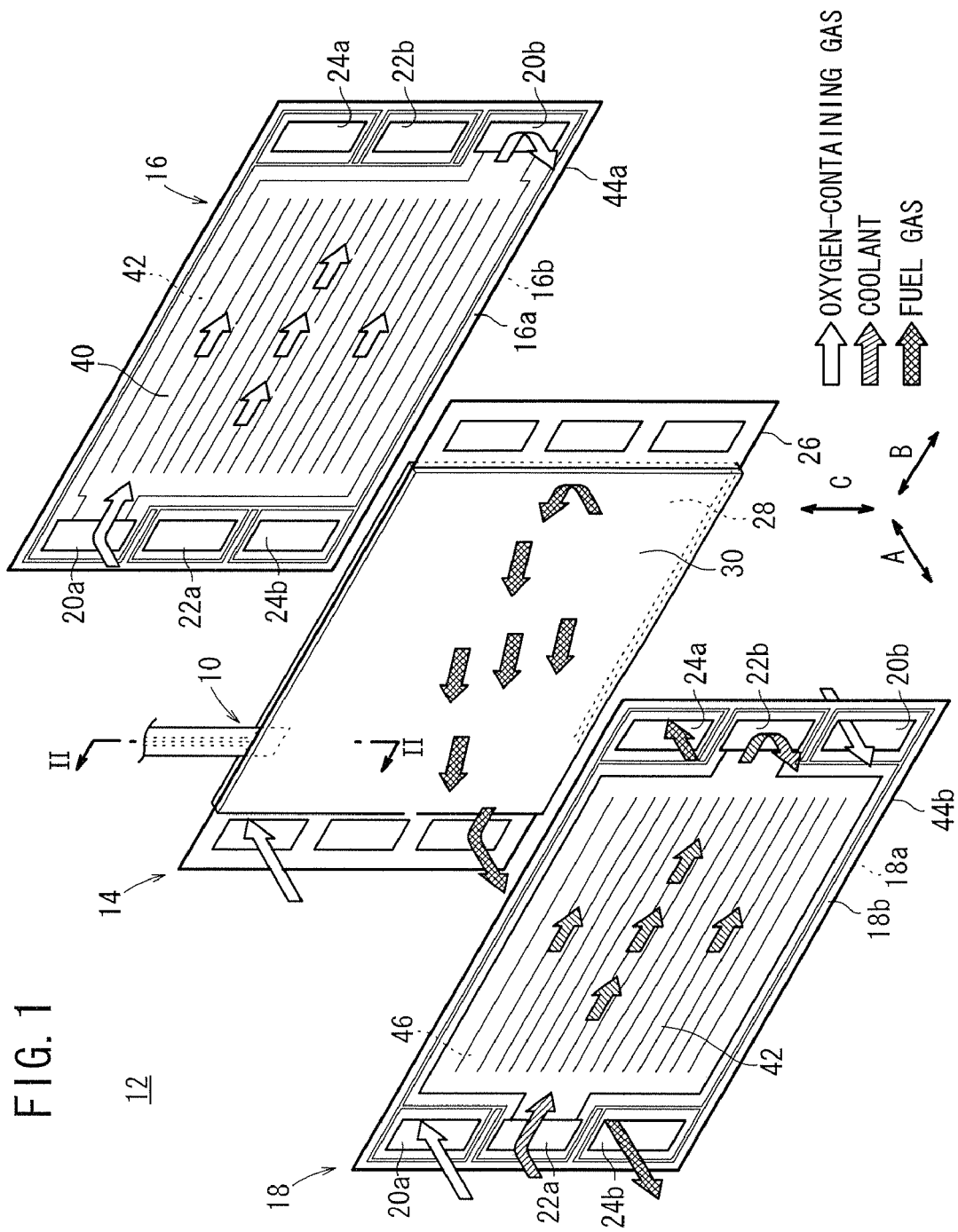
FIG. 1 is an exploded perspective view of essential components of a fuel cell, in which an electric potential measuring apparatus according to an embodiment of the present invention is incorporated.

As shown in FIG. 1, a fuel cell 12, in which an electric potential measuring apparatus (fuel cell potential measuring apparatus) 10 according to an embodiment of the present invention is incorporated, comprises a membrane electrode assembly (electrolyte electrode assembly) 14, and first and second separators 16, 18 which sandwich the membrane electrode assembly 14 therebetween. The first and second separators 16, 18 comprise metallic separators or carbon separators, for example.

An oxygen-containing gas supply passage 20a for supplying an oxygen-containing gas, a coolant supply passage 22a for supplying a coolant, and a fuel gas discharge passage 24b for discharging a fuel gas such as a hydrogen-containing gas, which extend through the fuel cell 12 in the stacking direction (the direction of arrow A), are disposed on one end edge portion in the direction of the arrow B (the horizontal direction in FIG. 1) of the fuel cell 12, and are arranged in this order in the direction of the arrow C (i.e., in the vertical direction).

A fuel gas supply passage 24a for supplying the fuel gas, a coolant discharge passage 22b for discharging the coolant, and an oxygen-containing gas discharge passage 20b for discharging the oxygen-containing gas, which extend through the fuel cell 12 in the direction of the arrow A, are disposed on another end edge portion in the direction of the arrow B of the fuel cell 12, and are arranged in this order in the direction of the arrow C.

The membrane electrode assembly 14 comprises a cathode 28, an anode 30, and a solid polymer electrolyte membrane 26 interposed between the cathode 28 and the anode 30. The solid polymer electrolyte membrane 26 is formed by impregnating a thin membrane of perfluorosulfonic acid with water, for example.

Figure 2:
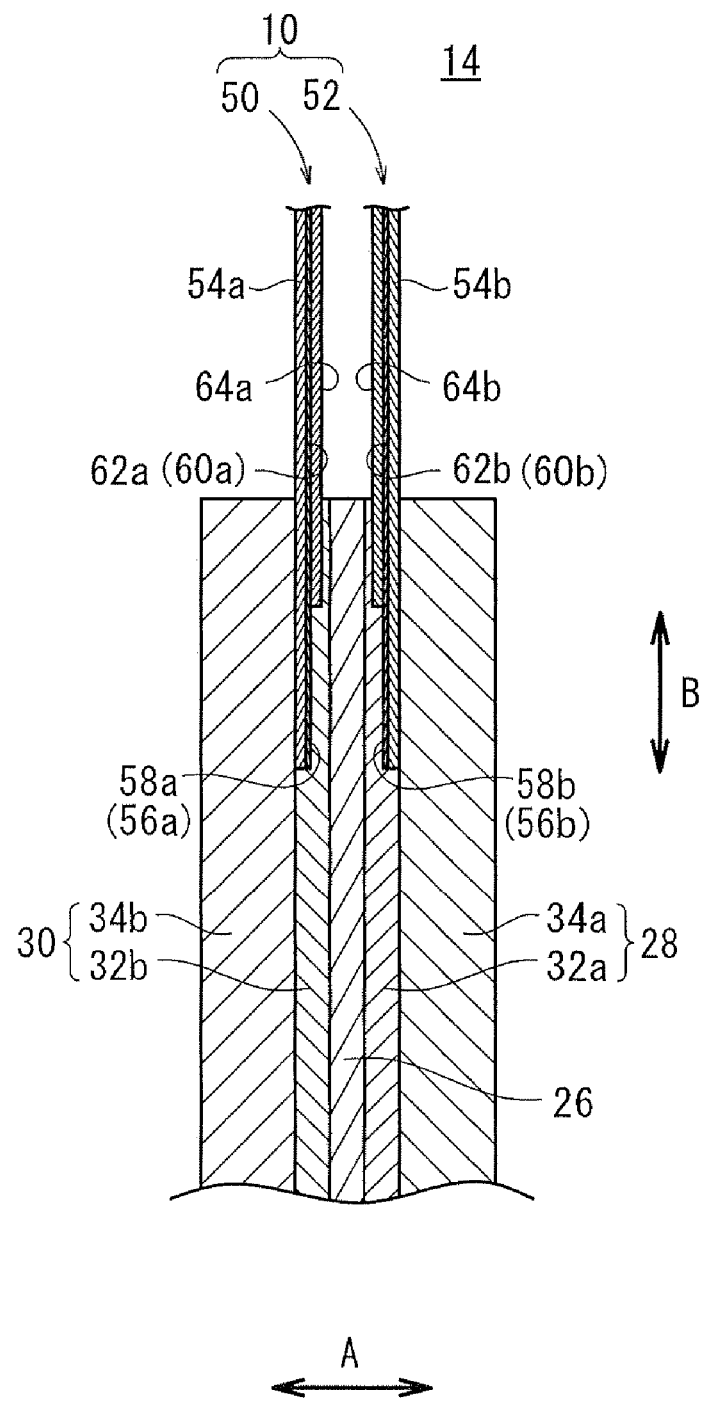
FIG. 2 is a cross sectional view of the fuel cell taken along line II-II in FIG. 1.

As shown in FIG. 2, the cathode 28 and the anode 30 include electrode catalyst layers 32a, 32b joined respectively to opposite surfaces of the solid polymer electrolyte membrane 26, and gas diffusion layers 34a, 34b made of carbon paper or the like, which are arranged on the electrode catalyst layers 32a, 32b. The electrode catalyst layers 32a, 32b are made up of platinum alloy supported on porous carbon particles, and are formed by depositing the carbon particles uniformly on both surfaces of the solid polymer electrolyte membrane 26.

An oxygen-containing gas flow field 40 is provided on a surface 16a of the first separator 16 facing the membrane electrode assembly 14. The oxygen-containing gas flow field 40 includes a plurality of grooves, which extend in the direction of the arrow B, communicating between the oxygen-containing gas supply passage 20a and the oxygen-containing gas discharge passage 20b. A coolant flow field 42 is disposed on a surface 16b of the first separator 16, between the surface 16b and another surface 18b of the second separator 18. A first sealing member 44a is disposed around the edge of the first separator 16.

A fuel gas flow field 46 is provided on a surface 18a of the second separator 18 facing the membrane electrode assembly 14. The fuel gas flow field 46, similar to the oxygen-containing gas flow field 40, includes a plurality of grooves, which extend in the direction of the arrow B, communicating between the fuel gas supply passage 24a and the fuel gas discharge passage 24b. A second sealing member 44b is disposed around the edge of the second separator 18.

Figure 3:
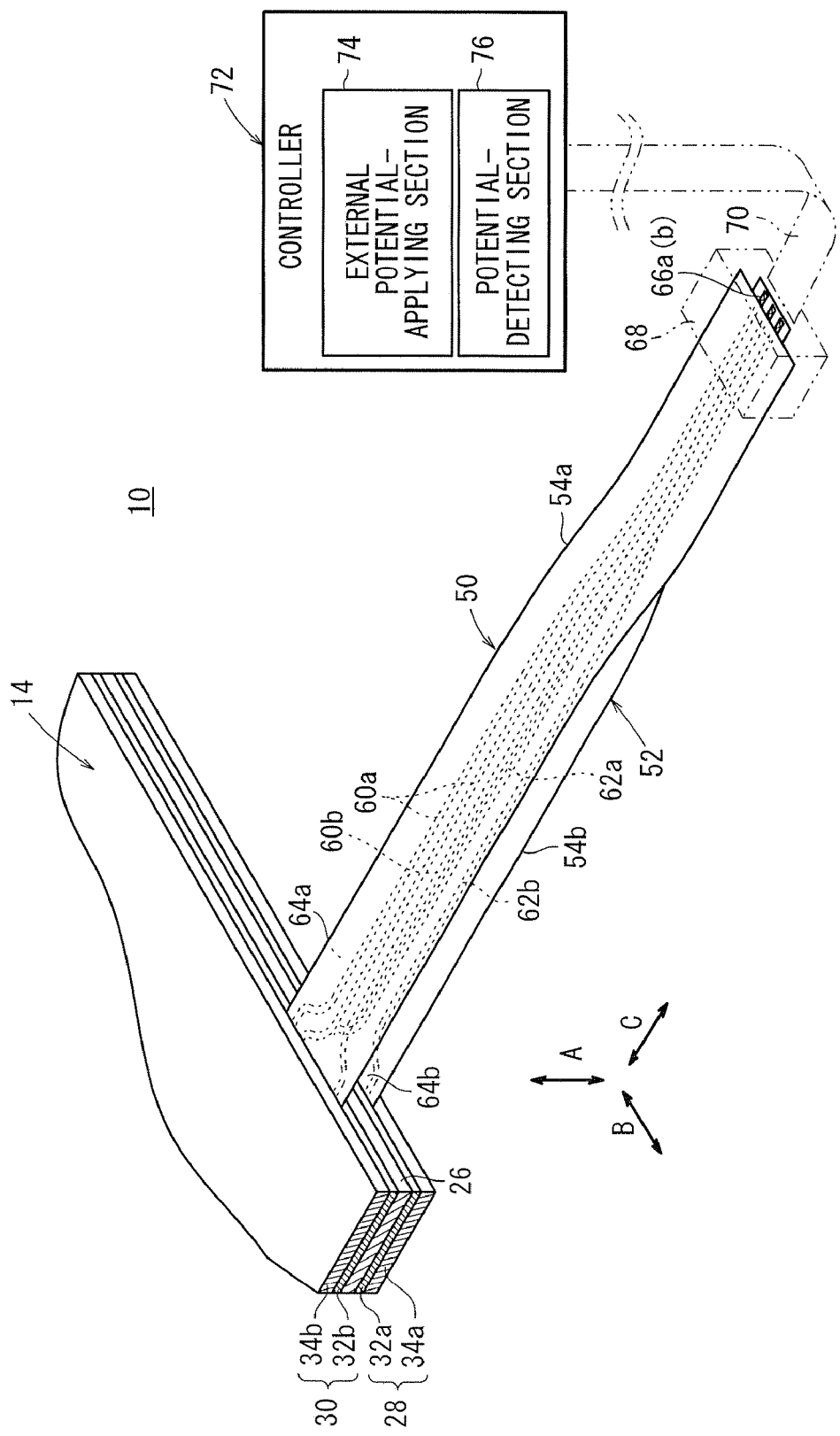
FIG. 3 is an outline schematic view of the electric potential measuring apparatus.

As shown in FIGS. 2 and 3, the electric potential measuring apparatus 10 comprises a first sheet member 50 on which the anode 30 is disposed, and a second sheet member 52 on which the cathode 28 is disposed.

Figure 4:
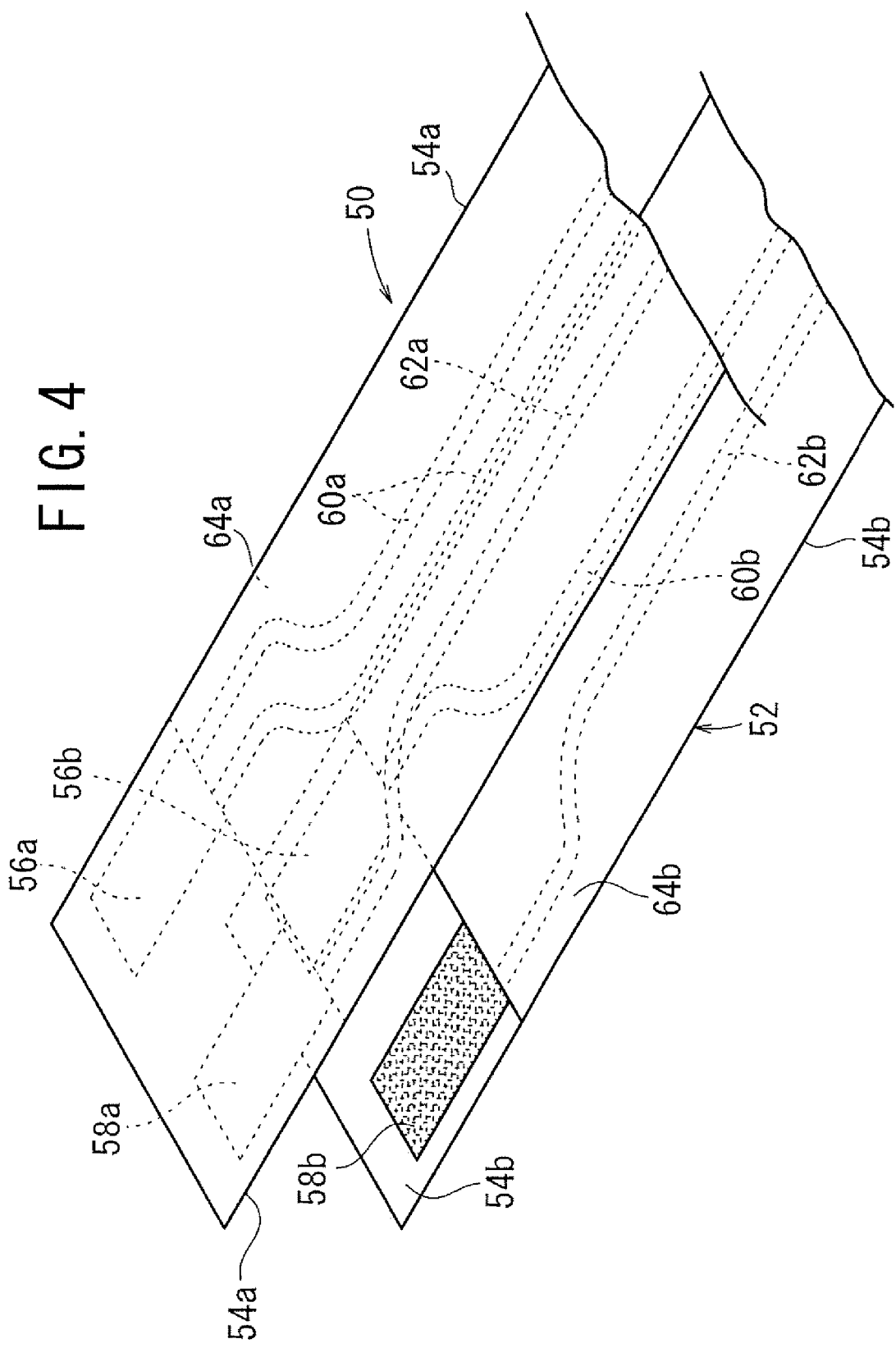
FIG. 4 is a partially enlarged schematic view of the electric potential measuring apparatus.

The first and second sheet members 50, 52 include sheet-like base members 54a, 54b formed by a liquid crystal polymer (LCP), for example. On one end on the anode 30 side of the sheet-like base member 54a, an anode side potential-applying electrode (reference electrode) 56a, and an anode side potential-measuring electrode (potential measuring probe) 58a are disposed integrally, whereas on one end on the cathode 28 side of the sheet-like base member 54b, a cathode side potential-applying electrode (reference electrode) 56b, and a cathode side potential-measuring electrode (potential measuring probe) 58b are disposed integrally (refer to FIGS. 2 through 4).

Two conductive lines 60a are connected to the potential-applying electrode 56a on the anode side, whereas a single conductive line 60b is connected to the potential-applying electrode 56b on the cathode side. By utilizing the two conductive lines 60a, influence on the measurement potential by the applied potential can be prevented. The conductive lines 60a, 60b extend along the longitudinal direction of the sheet-like base members 54a, 54b to the other end of the sheet-like base members 54a, 54b. Individual conductive lines 62a, 62b are connected respectively to the potential-measuring electrodes 58a, 58b. The conductive lines 62a, 62b extend along the longitudinal direction of the sheet-like base members 54a, 54b to the other end of the sheet-like base members 54a, 54b.

The sheet-like base members 54a, 54b are arranged such that the respective potential-applying electrodes 56a, 56b and the respective potential-measuring electrodes 58a, 58b thereof mutually confront one another. Cover films 64a, 64b are affixed on the mutually confronting surfaces thereof, so that only the potential-applying electrodes 56a, 56b and the potential-measuring electrodes 58a, 58b are left externally exposed.

The sheet-like base members 54a, 54b are mutually joined together by thermocompression bonding at least at one portion of the mutually facing cover films 64a, 64b. At the other end thereof on both sides of the sheet-like base members 54a, 54b, exposed terminal regions 66a, 66b of the conductive lines 60a, 62a, 60b, 62b for connecting a connector thereto are formed by partial removal of the sheet-like base members 54a, 54b (see FIG. 3).

A connector 68 is connected to the terminal regions 66a, 66b. The connector 68 is connected to a controller 72 via a cable 70, and the controller 72 is equipped with an external potential-applying section 74 and a potential-detecting section 76.

Figure 5:
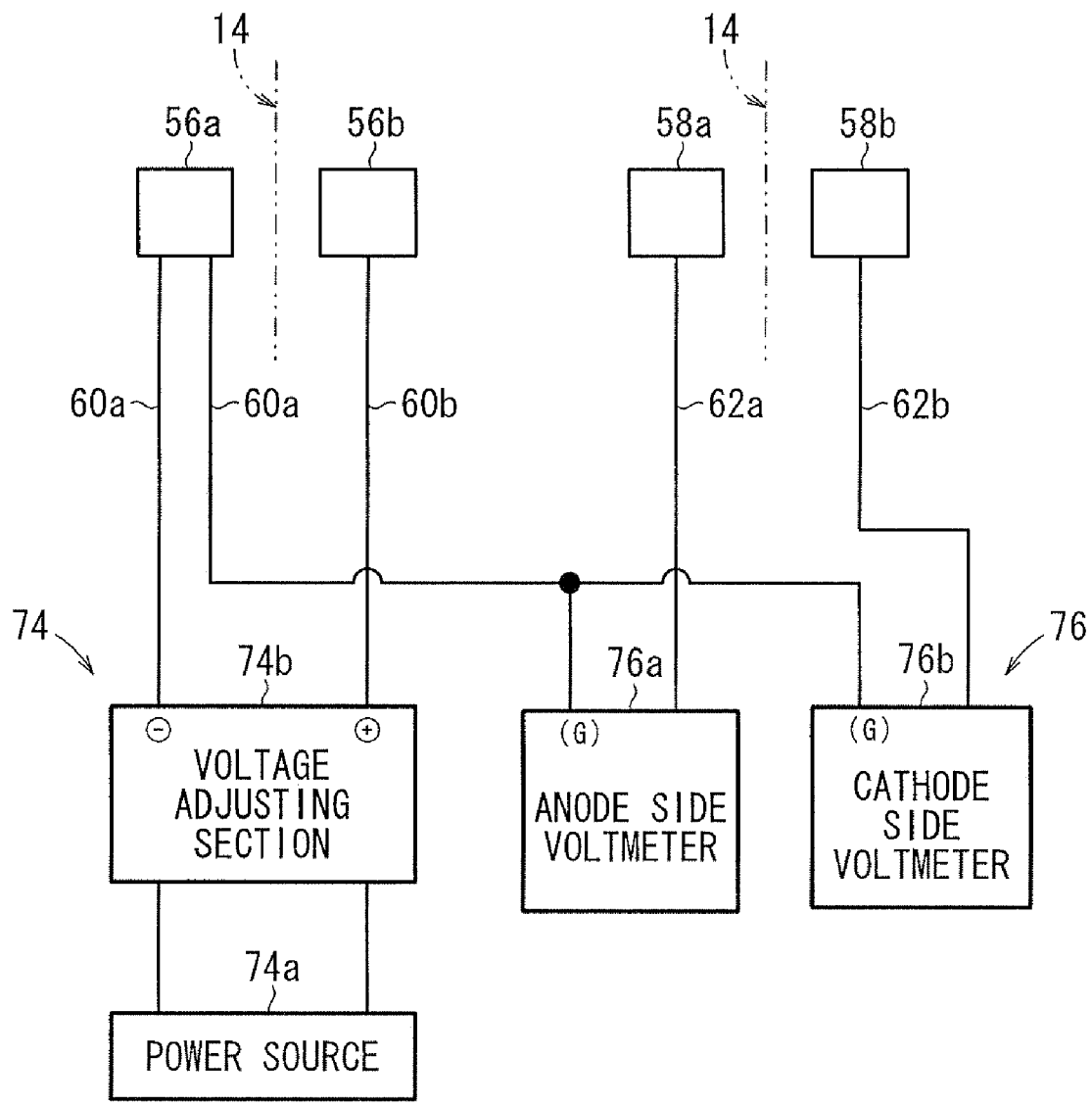
FIG. 5 is a schematic view of a controller constituting the electric potential measuring apparatus.

As shown in FIG. 5, the external potential-applying section 74 comprises a DC power source 74a for imposing a predetermined electric potential to the potential-applying electrodes 56a, 56b through the conductive lines 60a, 60b, and a voltage adjusting section 74b for adjusting the voltage supplied from the power source 74a. The anode side potential-applying electrode 56a is connected to a minus (negative) terminal through one of the conductive lines 60a, whereas the cathode side potential-applying electrode 56b is connected to a plus (positive) terminal through the conductive line 60b.

The potential-detecting section 76 comprises an anode side voltmeter 76a and a cathode side voltmeter 76b connected to the conductive lines 62a, 62b for detecting a potential difference between the potential detected by the potential-measuring electrodes 58a, 58b and the potential of the potential-applying electrode 56a. An anode side conductive line 62a is connected to the anode side voltmeter 76a, and a cathode side conductive line 62b is connected to the cathode side voltmeter 76b. The other conductive line 60a of the anode side potential-applying electrode 56a is connected as a ground line (G) to both the anode side voltmeter 76a and the cathode side voltmeter 76b.

As shown in FIGS. 2 and 3, the potential-applying electrode 56a is in contact with an electrode catalyst layer (not shown), which is cut out independently from the electrode catalyst layer 32b of the anode 30, whereas the other potential-applying electrode 56b is in contact with an electrode catalyst layer (not shown), which is cut out independently from the electrode catalyst layer 32a of the cathode 28. The potential-measuring electrodes 58a, 58b are arranged in proximity to the potential-applying electrodes 56a, 56b and in contact with the electrode catalyst layers 32b, 32a. In the independently-arranged electrode catalyst layers (not shown), an electrolytic reaction with water is carried out.

The catalyst layers may also be disposed directly on the potential-applying electrodes 56a, 56b. Further, the first and second sheet members 50, 52 may be disposed in a plurality of given locations of the membrane electrode assembly 14.

Figure 6:
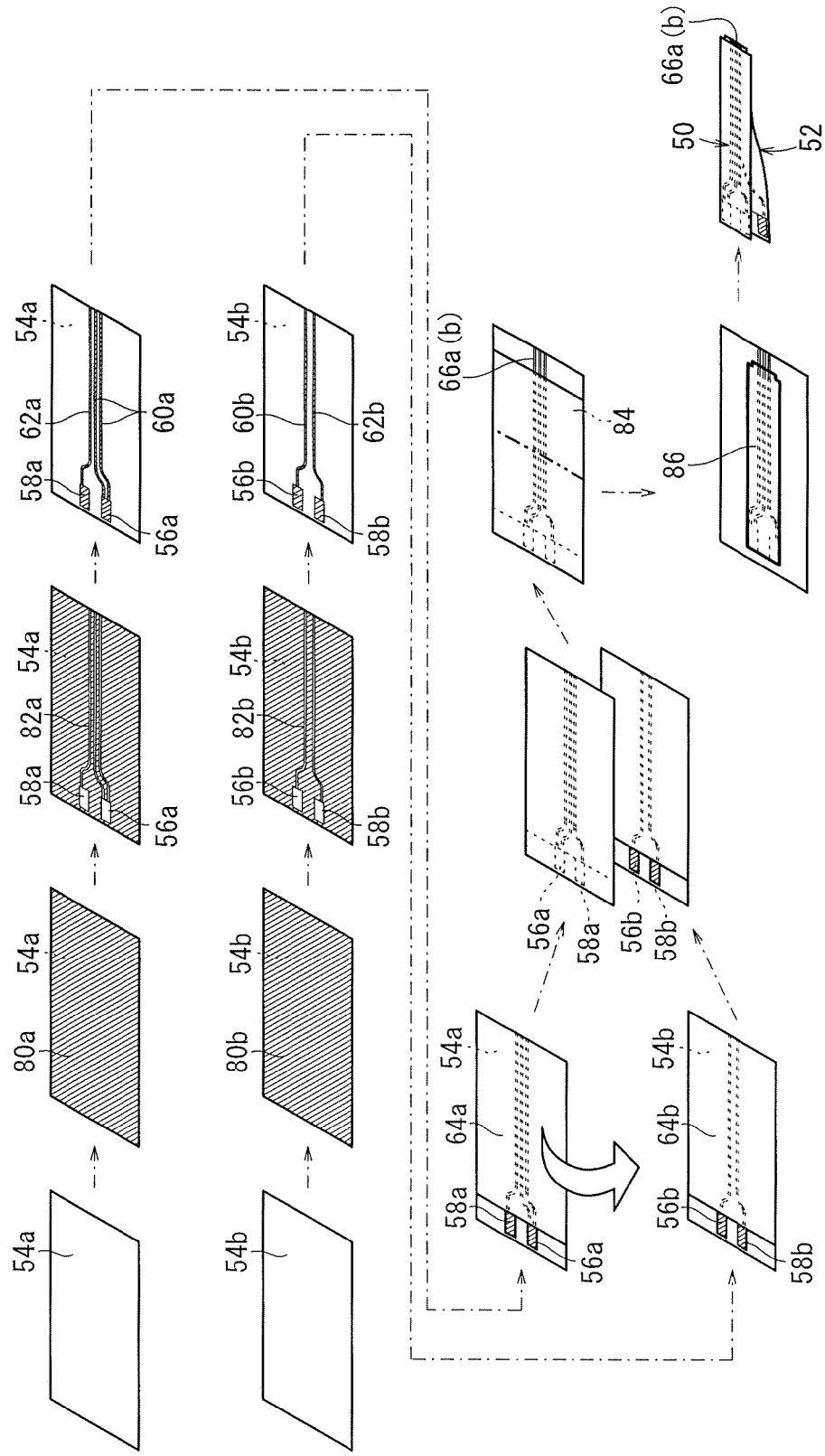
FIG. 6 is an explanatory drawing of a manufacturing process for the electric potential measuring apparatus.
Figure 7:
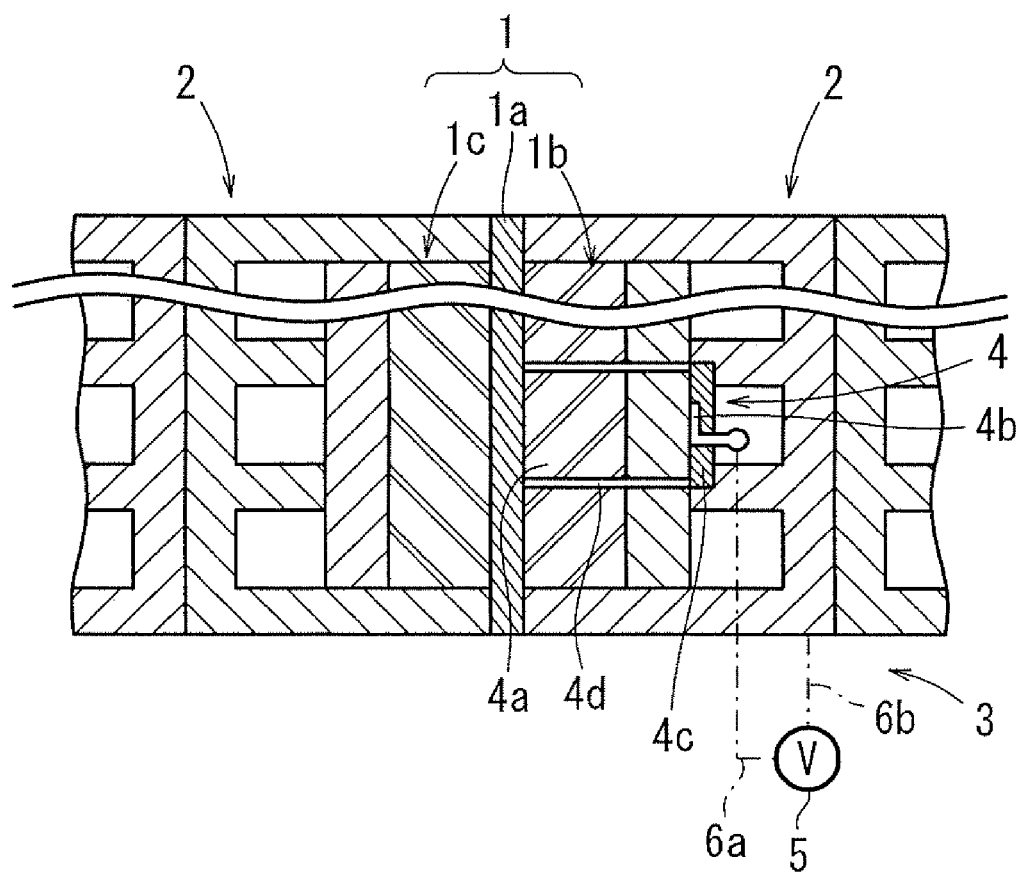
FIG. 7 is a cross sectional schematic view of a fuel cell stack equipped with an electric potential measuring apparatus according to a conventional technique.

Next, a method for manufacturing the electric potential measuring apparatus 10 will be explained below with reference to the manufacturing process explanatory drawing of FIG. 6.

First, respective sheet-like base members 54a, 54b are prepared corresponding to the anode side and the cathode side, and vapor deposition layers 80a, 80b of Pt or Au are formed on the sheet-like base members 54a, 54b.

Resist coating layers 82a, 82b including predetermined wiring formations are formed on the vapor deposition layers 80a, 80b. By effecting an exposure (etching) process on the resist coating layers 82a, 82b and removing unnecessary portions of the vapor deposition layers 80a, 80b, the potential-applying electrodes 56a, 56b, the potential-measuring electrodes 58a, 58b, and the conductive lines 60a, 60b, 62a, 62b are created by pattern formation.

Next, the cover films 64a, 64b are thermocompression bonded onto the sheet-like base members 54a, 54b while leaving externally exposed only the potential-applying electrodes 56a, 56b and the potential-measuring electrodes 58a, 58b. The cover films 64a, 64b, similar to the sheet-like base members 54a, 54b, are formed by a liquid crystal polymer, for example, and are set to have a lower melting point than the sheet-like base members 54a, 54b.

Furthermore, the sheet-like base members 54a, 54b are placed on each other, with the respective cover films 64a, 64b made to confront each other. In this condition, a thermocompression bonding process is effected on another end portion opposite to one end portion where the potential-applying electrodes 56a, 56b and the potential-measuring electrodes 58a, 58b are disposed, whereby a pressure-bonded portion 84 is formed. By carrying out laser processing on opposite surfaces of the pressure-bonded portion 84, portions of the sheet-like base members 54a, 54b are removed, thereby forming the terminal regions 66a, 66b.

Trimming processing is effected on the sheet-like base members 54a, 54b along a trimming-processed region 86 thereof. As a result, respective other end portions of the first sheet member 50 and the second sheet member 52 are joined together and made integral.

In addition, as shown in FIG. 3, electrode catalyst layers 32a, 32b are formed on opposite surfaces of the solid polymer electrolyte membrane 26, and together therewith, electrode catalyst layers, which are cut out and independent from the electrode catalyst layers 32a, 32b, also are formed. The solid polymer electrolyte membrane 26 is disposed between ends of the first and second sheet members 50, 52.

At the first sheet member 50, the potential-applying electrode 56a is disposed on the independently formed electrode catalyst layer, and the potential-measuring electrode 58a is disposed on the electrode catalyst layer 32a. Similarly, at the second sheet member 52, the potential-applying electrode 56b is disposed on the independently formed electrode catalyst layer, and the potential-measuring electrode 58b is disposed on the electrode catalyst layer 32b.

In this condition, the gas diffusion layers 34b, 34a are stacked on the electrode catalyst layers 32b, 32a such that the first and second sheet members 50, 52 are interposed between the gas diffusion layers 34b, 34a, and such members are joined together integrally by hot pressing. Owing thereto, the membrane electrode assembly 14, in which the first and second sheet members 50, 52 are integrally incorporated, is manufactured.

Next, a fuel cell 12 is constructed by arranging the first and second separators 16, 18 so as to sandwich the membrane electrode assembly 14 therebetween. The connector 68 is connected to the terminal regions 66a, 66b provided at the other ends of the first and second sheet members 50, 52.

Although not shown, a fuel cell stack is constructed by stacking together a plurality of such fuel cells 12. The fuel cell stack may be tightened together and retained through tie rods, or is accommodated inside a box-shaped casing.

Operations of the fuel cell 12 shall be explained below.

As shown in FIG. 1, an oxygen-containing gas is supplied to the oxygen-containing gas supply passage 20a, and together therewith, a fuel gas such as a hydrogen-containing gas is supplied to the fuel gas supply passage 24a. Furthermore, a coolant such as pure water, ethylene glycol or the like is supplied to the coolant supply passage 22a.

The oxygen-containing gas is introduced into the oxygen-containing gas flow field 40 disposed in the first separator 16 and moves along the cathode 28 constituting the membrane electrode assembly 14. On the other hand, the fuel gas supplied to the fuel gas supply passage 24a is introduced into the fuel gas flow field 46 of the second separator 18 and moves along the anode 30 constituting the membrane electrode assembly 14.

Accordingly, at the membrane electrode assembly 14, the oxygen-containing gas supplied to the cathode 28 and the fuel gas supplied to the anode 30 are consumed by an electrochemical reaction inside the electrode catalyst layers 32a, 32b, whereupon generation of electrical power is carried out.

Next, the oxygen-containing gas, which is supplied to the cathode 28 and consumed therein, is discharged through the oxygen-containing gas discharge passage 20b. Similarly, the fuel gas, which is supplied to the anode 30 and consumed therein, is discharged through the fuel gas discharge passage 24b.

Further, the coolant supplied to the coolant supply passage 22a is introduced into the coolant flow field 42 between the first and second separators 16, 18. The coolant, after having cooled the membrane electrode assembly 14, is discharged through the coolant discharge passage 22b.

Next, supply of the oxygen-containing gas, the fuel gas, and the coolant is halted, whereby operation of the fuel cell 12 is stopped. At this time, residual oxygen-containing gas remains in the oxygen-containing gas flow field 40, whereas residual fuel gas remains in the fuel gas flow field 46. As a result, it is easy for a local cell to be formed within the power-generating surfaces of the membrane electrode assembly 14.

Herein, as shown in FIG. 3, in the electric potential measuring apparatus 10, a predetermined potential is imposed on the potential-applying electrodes 56a, 56b under operation of the external potential-applying section 74, and together therewith, a potential difference of the anode 30 and a potential difference of the cathode 28 are detected through the potential-measuring electrodes 58a, 58b under operation of the potential-detecting section 76.

More specifically, as shown in FIG. 5, to the anode side voltmeter 76a and the cathode side voltmeter 76b, one conductive line 60a of the potential-applying electrode 56a is connected as a ground line, and detection voltages of the potential-measuring electrodes 58a, 58b are input to the anode side voltmeter 76a and the cathode side voltmeter 76b. Accordingly, at the anode side voltmeter 76a, a potential difference between the potential-applying electrode 56a and the potential-measuring electrode 58a on the anode side is detected. Similarly, at the cathode side voltmeter 76b, a potential difference between the potential-applying electrode 56a and the potential-measuring electrode 58b on the cathode side is detected.

In this case, according to the present embodiment, the first sheet member 50 on which the anode side potential-applying electrode 56a and the anode side potential-measuring electrode 58a are disposed integrally, and the second sheet member 52 on which the cathode side potential-applying electrode 56b and the cathode side potential-measuring electrode 58b are disposed integrally, are joined together mutually.

Accordingly, for example, compared to a case in which the potential-applying electrodes 56a, 56b and the potential-measuring electrodes 58a, 58b are constituted separately, structure of the device is simplified, the work required for assembly thereof is significantly reduced, and the apparatus is economical in cost.

In addition, according to the present embodiment, the electric potential measuring apparatus 10 is constituted by the first sheet member 50 and the second sheet member 52, the other end portions thereof being joined together respectively in an integral manner. Together therewith, the respective one end portions are arranged between the gas diffusion layers 34a, 34b from an outer side of the solid polymer electrolyte membrane 26 and integrated by means of hot pressing. Consequently, by means of a simple structure and process, merely by sandwiching thereof from an outer circumferential side of the membrane electrode assembly 14, measurement of electric potential of the fuel cell 12 can be preformed favorably and reliably, while also enabling a reduction in the overall thickness of the fuel cell 12. Accordingly, potential measurements in a power generating state during normal operation of the fuel cell 12 can be preformed. The electric potential measuring apparatus 10 can be assembled directly into a conventional fuel cell stack, without increasing in size the thickness of the assembly location thereof.

Further, the potential-applying electrodes 56a, 56b are arranged within the electrode surface, and additionally, in proximity to the potential-measuring electrodes 58a, 58b. Owing thereto, a potential difference with a reference potential due to electrolysis of water can be reliably detected, and more accurate potential measurements can be implemented.

Still further, in the first and second sheet members 50, 52, portions apart from the potential-applying electrodes 56a, 56b and the potential-measuring electrodes 58a, 58b are covered by insulating cover films 64a, 64b. Accordingly, the potential of a minute region where measurement actually is desired can be measured accurately.

Further, the first sheet member 50 and the second sheet member 52 are formed integrally by joining together the other end portions thereof. Consequently, when the solid polymer electrolyte membrane 26 is interposed between the first and second sheet members 50, 52, generation of shifting between the potential-applying electrodes 56a, 56b and between the potential-measuring electrodes 58a, 58b does not occur, so that measurement accuracy can be favorably improved.

While the invention has been particularly shown and described with reference to preferred embodiments, it will be understood that variations and modifications can be effected thereto by those skilled in the art without departing from the scope of the invention as defined by the appended claims.

What is claimed is:

1. A fuel cell potential measuring apparatus, for measuring an electric potential of a fuel cell, in which an electrolyte electrode assembly made up of an anode and a cathode provided on respective opposite sides of an electrolyte is interposed between separators, comprising:
   a first sheet member on which an anode potential-applying electrode and an anode potential-measuring electrode are disposed on an end portion thereof which is arranged on the anode; and
   a second sheet member on which a cathode potential-applying electrode and a cathode potential-measuring electrode are disposed on an end portion thereof which is arranged on the cathode,
   wherein another end portion of the first sheet member and another end portion of the second sheet member are joined together mutually.

2. A fuel cell potential measuring apparatus according to claim 1, wherein terminal regions for connecting a connector are formed in the other end portion of the first sheet member and in the other end portion of the second sheet member.

3. A fuel cell potential measuring apparatus according to claim 1, wherein:
   the anode potential-applying electrode and the anode potential-measuring electrode are formed integrally as patterns in the first sheet member, and
   the cathode potential-applying electrode and the cathode potential-measuring electrode are formed integrally as patterns in the second sheet member.

4. A fuel cell potential measuring apparatus according to claim 1, wherein:
   a cover film for leaving externally exposed only the anode potential-applying electrode and the anode potential-measuring electrode is disposed on the first sheet member,
   a cover film for leaving externally exposed only the cathode potential-applying electrode and the cathode potential-measuring electrode is disposed on the second sheet member, and the first sheet member and the second sheet member are joined together mutually such that the anode potential-applying electrode and the anode potential-measuring electrode face toward and confront the cathode potential-applying electrode and the cathode potential-measuring electrode.

5. A fuel cell potential measuring apparatus according to claim 1, wherein:
one end of the first sheet member is mounted between an electrode catalyst layer and a gas diffusion layer that make up the anode, and
one end of the second sheet member is mounted between an electrode catalyst layer and a gas diffusion layer that make up the cathode.

6. A manufacturing method for a fuel cell potential measuring apparatus for measuring an electric potential of a fuel cell, in which a electrolyte electrode assembly made up of an anode and a cathode provided on respective opposite sides of an electrolyte is interposed between separators, comprising the steps of:
integrally forming, on a sheet-like base member, patterns made up of a potential-applying electrode and a potential-measuring electrode;
affixing a cover film on the sheet-like base member, thereby forming a sheet member, while leaving only the potential-applying electrode and the potential-measuring electrode externally exposed thereon; and
in a state in which the potential-applying electrodes and the potential-measuring electrodes disposed respectively on ends of two of the sheet members face each other, joining together respectively other end portions of the two sheet members.

7. A manufacturing method for a fuel cell potential measuring apparatus according to claim 6, further comprising the step of forming terminal regions for connecting a connector by partially removing the sheet-like base member from opposite surfaces of the other end portions where the two sheet members are joined together.

8. A manufacturing method for a fuel cell potential measuring apparatus according to claim 6, wherein:
one end of the one sheet member is mounted and hot pressed between an electrode catalyst layer and a gas diffusion layer that make up the anode, and
one end of the other sheet member is mounted and hot pressed between an electrode catalyst layer and a gas diffusion layer that make up the cathode.

* * * * *